United States Patent [19]

Winbow et al.

[11] Patent Number: 4,932,003
[45] Date of Patent: Jun. 5, 1990

[54] ACOUSTIC QUADRUPOLE SHEAR WAVE LOGGING DEVICE

[75] Inventors: Graham A. Winbow, Houston; Sen-Tsuen Chen, Sugar Land; James A. Rice, Houston, all of Tex.

[73] Assignee: Exxon Production Research Company, Houston, Tex.

[21] Appl. No.: 379,684

[22] Filed: May 19, 1982

[51] Int. Cl.$^5$ .............................................. G01V 1/40
[52] U.S. Cl. ...................................... 367/75; 367/25; 181/102; 181/104; 181/106
[58] Field of Search ................... 73/151, 152; 181/102, 181/104, 105, 106; 310/333, 368; 367/25, 35, 75, 155, 157, 159

[56] References Cited

U.S. PATENT DOCUMENTS

| | | | |
|---|---|---|---|
| 2,209,100 | 7/1940 | Minton | 367/43 |
| 3,325,780 | 6/1967 | Horan | 73/596 |
| 3,360,664 | 12/1967 | Straube | 367/160 |
| 3,363,118 | 1/1968 | Sims | 367/160 |
| 3,583,677 | 6/1971 | Phillips | 310/333 |
| 3,593,255 | 7/1971 | White | 340/15.5 |
| 3,821,740 | 6/1974 | Ehrlich | 367/105 |
| 3,992,693 | 11/1976 | Martin et al. | 367/166 |
| 4,237,399 | 12/1980 | Sakamoto | 310/317 |
| 4,245,172 | 1/1981 | Shirley | 310/332 |

FOREIGN PATENT DOCUMENTS

| | | |
|---|---|---|
| 0031989 | 7/1981 | European Pat. Off. |
| 0996964 | 2/1983 | U.S.S.R. ............. 181/113 |
| 1193381 | 5/1970 | United Kingdom . |
| 1193382 | 5/1970 | United Kingdom . |
| 1193383 | 5/1970 | United Kingdom . |

OTHER PUBLICATIONS

"Theoritical Basis of Quadrupole Well-logging," Gawin, A., Acta Geophysica Polonica, vol. 19, #2, 1971.
Graham A. Winbow, "How To Separate Compressional and Shear Arrivals in a Sonic Log" 50th Annual Int. Meeting of SEG, Houston, Texas, Nov. 17-20, (1980).
J. E. White, et al., "Computed Response of an Acoustic Logging Tool", Geophysics, vol. 33, No. 2 (Apr. 1968), pp. 302-310.
J. E. White, "The Hula Log: A Proposed Acoustic Tool," Trans Soc. Professional Well Log Analysts, Eighth Annual Logging Symposium, Paper I (1967).

Primary Examiner—Ian J. Lobo
Attorney, Agent, or Firm—Alfred A. Equitz; Herbert E. O'Niell

[57] ABSTRACT

The quadrupole shear wave logging device of this invention includes a logging sonde, means for generating a quadrupole shear wave in the earth formation surrounding a borehole containing fluid, and means for detecting in the fluid the refraction of the quadrupole shear wave. In the preferred embodiment, the generating means comprises four similar sectors of a hollow piezoelectric cylinder. The four cylinders are polarized radially. The four sectors are so connected to the sonde that they are in the form of a split cylinder coaxial with the sonde axis. Electrical pulses of similar waveforms are applied across the inner and outer cylindrical surfaces of each sector to vibrate the four sectors. The electrical pulses are of such polarities that, during their initial motions of vibration, two oppositely situated sectors are caused to move outward and the remaining two oppositely situated sectors to move inward substantially simultaneously. Thus, the oppositely situated sectors will vibrate in phase whereas adjacent sectors will vibrate substantially opposite in phase. The vibrations of the four sectors generate four pressure waves: two positive pressure waves and two negative pressure waves. The four pressure waves generated will interfere and produce a quadrupole shear wave in the formation. The pressure wave in the fluid caused by refraction of such quadrupole shear wave is detected by the detecting means comprising two detectors in the fluid spaced apart longitudinally from each other and from the generating means. Shear velocity of the formation may be determined from the time interval between the detections of the refraction of the quadrupole shear wave by the two detectors.

22 Claims, 6 Drawing Sheets

ACOUSTIC QUADRUPOLE SHEAR WAVE LOGGING DEVICE

This invention relates to well logging in general and more particularly, to acoustic shear wave well logging.

BACKGROUND OF THE INVENTION

In acoustic well logging, it is customary to measure the compressional or pressure wave velocity of earth formations surrounding boreholes. A conventional pressure wave velocity logging system includes a cylindrical logging sonde suitable to be suspended downhole in the borehole fluid, a source connected to the sonde for generating pressure waves in the borehole fluid, and one or more detectors connected to the sonde and spaced apart from the pressure wave source for detecting pressure waves in the borehole fluid. A pressure wave in the borehole fluid generated by the source is refracted into the earth formation surrounding the borehole. It propagates through a portion of the formation and is refracted back into the borehole fluid at a point adjacent to the detector and is then detected by the detector. The ratio of the distance between the source and detector to the time between generation and detection of the pressure wave yields the pressure wave velocity of the formation. The distance between source and detector is usually fixed and known so that measurement of the time between pressure wave generation and detection is sufficient to determine the pressure wave velocity. For better accuracy, such distance is usually much greater than the dimensions of the source or detector. Information important for production of oil and gas from subterranean earth formations may be derived from the pressure wave velocities of such formations.

When a pressure wave generated by a pressure wave source in the borehole fluid reaches the borehole wall, it produces a refracted pressure wave in the surrounding earth formation as described above. In addition, it also produces a refracted shear wave in the surrounding earth formation and guided waves which travel in the borehole fluid and the part of the formation adjacent to the borehole. Part of such shear wave is refracted back into the borehole fluid in the form of a pressure wave and reach the detector in the logging sonde. The guided waves are also detected by such detector. Any wave that is one of the three types of waves detected by the detector may be called an arrival: the pressure waves in the borehole fluid caused by refraction of pressure waves in the formation the pressure wave arrivals, those caused by refraction of shear waves in the formation the shear wave arrivals, and those caused by guided waves the guided wave arrivals. Thus, the signal detected by the detector is a composite signal which includes the pressure wave arrival, the shear wave arrival and the guided wave arrivals. In earth formations pressure waves travel faster than shear waves and shear waves in the formation usually travel faster than the guided waves. Therefore, in the composite signal detected by the detector, the pressure wave arrival is the first arrival, the shear wave arrival the second arrival, and the guided wave arrivals the last arrivals. In measuring the pressure wave velocity of the formation, the time interval between generation of pressure waves and detection of the first arrival detected by the detector gives the approximate travel time of the refracted pressure wave in the formation. Hence the later shear wave and guided wave arrivals do not affect measurement of pressure wave velocity of the formation.

In addition to traveling over a vertical distance in the formation approximately equal to the distance between the source and detector, the pressure wave also travels over short distances in the fluid. The extra time required to travel such short distances introduces errors in the velocity log. To reduce such errors, conventional logging devices employ at least two detectors spaced vertically apart along the borehole from each other. The time interval between detection by the two detectors is measured instead of the time interval between transmission and detection. The ratio between the distance between the two detectors and such time interval yields the pressure wave velocity. Since the pressure wave travels over approximately equal short distances in the borehole fluid before reaching the two detectors, the time interval between detection by the two detectors is a more accurate measure of the actual travel time in the formation. Therefore, using two detectors and measuring the time between detection by the two detectors yield a more accurate pressure wave velocity. Other spurious effects such as borehole-size changes and sonde tilt may be reduced by conventional devices. One such device is described in *Log Interpretation*, Volume 1 - Principles, Schlumberger Limited, New York, N.Y. 10017, 1972 Edition, pages 37-38.

It is well known that shear wave velocity logging may also yield information important for production of oil and gas from subterranean earth formations. The ratio between the shear wave velocity and pressure wave velocity may reveal the rock lithology of the subterranean earth formations. The shear wave velocity log may also enable seismic shear wave time sections to be converted into depth sections. The shear wave log is also useful in determining other important characteristics of earth formations such as porosity, fluid saturation and the presence of fractures.

The conventional pressure wave logging source and the pressure waves it generates are symmetrical about the logging sonde axis. When such pressure waves are refracted into the surrounding earth formation, the relative amplitudes of the refracted shear and pressure waves are such that it is difficult to distinguish the later shear wave arrival from the earlier pressure wave arrival and from the reverberations in the borehole caused by refraction of the pressure wave in the formation. Therefore it is difficult to use a conventional symmetrical pressure wave source for logging shear wave velocity. Correlation techniques have been employed to extract the shear wave arrival from the full acoustic wave train recorded. Such techniques, however, usually require processing of data by using a computer so that shear wave velocities cannot be logged on line. It may also be difficult to extract the shear wave arrival if it is close in time to the pressure wave arrival.

Asymmetric pressure wave sources have been developed for logging shear wave velocity. Using such sources, the amplitude of the shear wave arrival may be significantly higher than that of the pressure wave arrival. By adjusting the triggering level of the detecting and recording systems to discriminate against the pressure wave arrival, the shear wave arrival is detected as the first arrival. It is thus possible to determine the travel time of shear waves in the formation and therefore the shear wave velocity. In such asymmetric sources, the source generates in the borehole fluid a positive pressure wave in one direction and a simultaneous negative pressure wave in the opposite direction. The interference of the two pressure waves may cause the amplitude of the refracted shear wave in the formation to be significantly greater than that of the refracted pressure wave in the formation. This type of asymmetric source is disclosed by Angona et al, European Patent Application No. 31989, White, U.S. Pat. No. 3,593,255, and Kitsunezaki, U.S. Pat. No. 4,207,961.

Angona et al disclose a bender-type source which comprises two piezoelectric plates bonded together and attached to a logging sonde. When voltage is applied across the two piezoelectric plates, the plates will bend. The bending of the transducer plates creates a positive pressure wave in one direction and a simultaneous negative pressure wave in the opposite direction. White discloses a pressure wave source comprising two piezoelectric segments each in the shape of a half hollow cylinder. The two segments are assembled to form a split cylinder. The two segments have opposite polarization and electrical voltage is applied to each segment, causing one segment to expand radially and simultaneously causing the other segment to contract radially, thereby producing a positive pressure wave in one direction and a simultaneous negative pressure wave in the opposite direction. In Kitsunezaki, coils mounted on a bobbin assembly are placed in the magnetic field of a permanent magnet and current is passed through the coils to drive the bobbin assembly. The movement of the bobbin assembly ejects a volume of water in one direction and simultaneously sucks in an equivalent volume of water in the opposite direction, thereby generating a positive pressure wave in one direction and a simultaneous negative pressure wave in the opposite direction.

In another type of shear wave logging source, instead of coupling the source to the borehole wall through the medium of the borehole fluid, the source is either coupled directly to the borehole wall or through mechanical means such as mounting pads. Such shear wave logging sources are disclosed in Erickson et al, U.S. Pat. No. 3,354,983 and Vogel, U.S. Pat. No. 3,949,352.

SUMMARY OF THE INVENTION

Figure 1A:
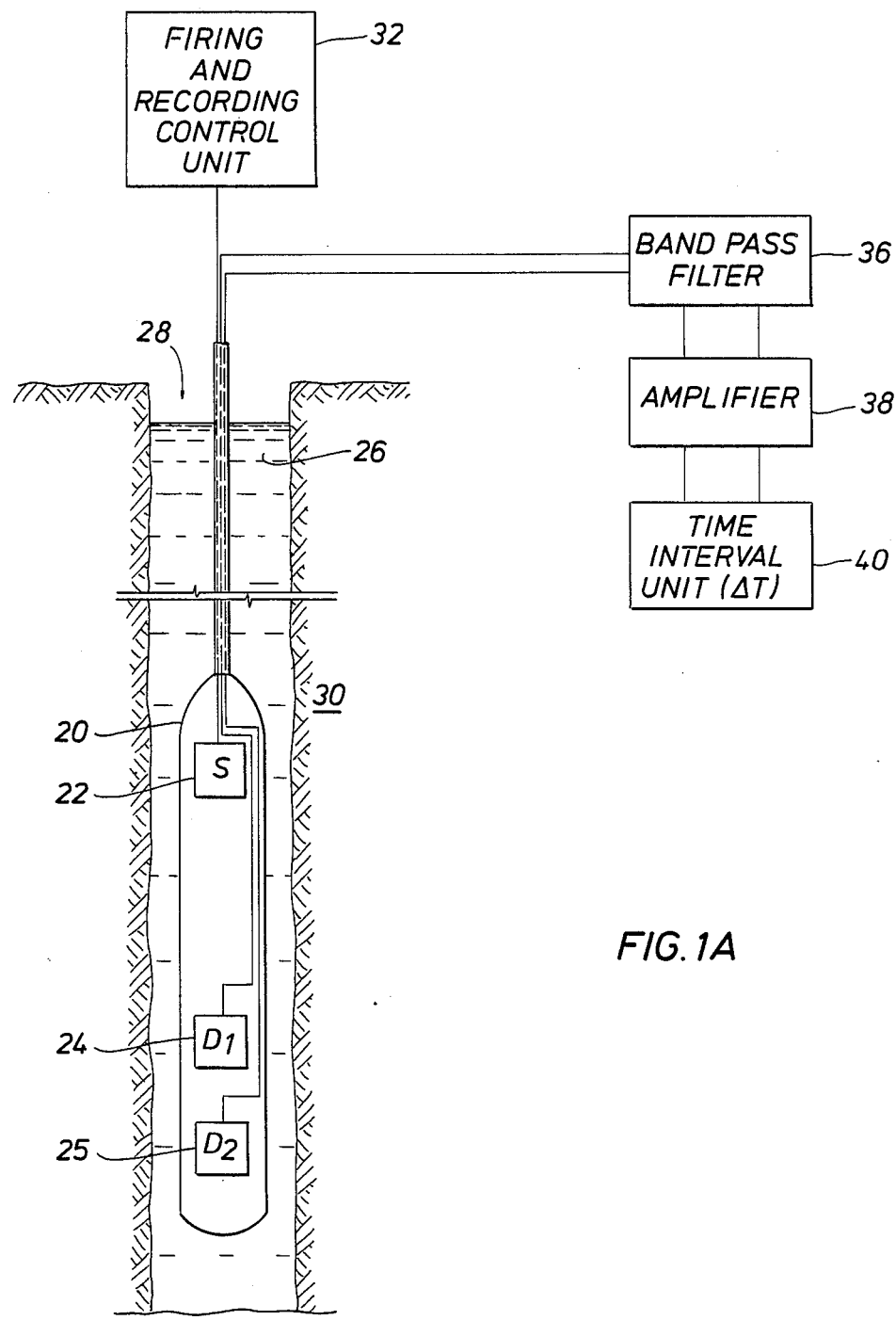
FIG. 1A is a schematic view of an acoustic logging system illustrating this invention.

The method and apparatus of this invention are for logging the shear wave velocity of an earth formation surrounding a well or borehole. The method of this invention comprises transmitting a quadrupole shear wave through the earth along the well, detecting the arrival of the shear wave at a point longitudinally spaced along the well from the point of transmission and measuring the time lapse between the transmission and the detection to determine the velocity of the shear wave through the earth formation. The apparatus of this invention comprises a housing adapted to be raised and lowered into a well, signal generating means in the housing for transmitting a quadrupole shear wave into the earth formation surrounding the well, and signal detecting means in the housing longitudinally spaced along the well from the signal generating means for detecting the arrival of such quadrupole shear wave.

In the preferred embodiment, a quadrupole shear wave is transmitted into earth surrounding a well containing fluid by generating in the fluid substantially simultaneously four pressure waves: a first and second positive pressure wave, and a first and second negative pressure wave. The first and second negative pressure waves are generated at a first and a second point in a fluid respectively and the first and second positive pressure waves at a third and a fourth point in the fluid respectively. The first, second, third and fourth points are so located that in a quadrilateral, the four corners of which are defined by the first, second and third points and the normal projection of the fourth point on a plane defined by and containing the first, second and third points, the four angles of the quadrilateral are each less than 180°. The first and second points define opposite corners of the quadrilateral. The frequency range of each of the four pressure waves contains an overlapping portion of frequencies defined as a range of frequencies common to the frequency ranges of the four pressure waves. Each of the four pressure waves contains a component wave common to all four pressure waves, said component wave having frequencies in the overlapping portion. The four pressure waves so generated will interfere and produce a quadrupole shear wave in the earth formation surrounding the borehole.

Where a quadrupole type detector is used to detect the wave caused by the quadrupole shear wave source, it is possible to reduce noise caused by monopole and dipole signals. The quadrupole detector is aligned with and spaced apart from the quadrupole shear wave source. The source and detector are used to generate the first logging record as above described. The source is rotated by substantially 90° about a line passing through the source and the detector. The second logging record is generated. The source is rotated by substantially another 90° so that it is substantially rotated 180° from its position during the generation of the first logging record. A third logging record is generated. The source is rotated by substantially 90° so that it is rotated substantially 180° from its position during the generation of the second logging record. A fourth logging record is generated. Monopole and dipole shear wave noises are reduced by subtracting the sum of the second and fourth logging records from the sum of the first and third logging records.

DESCRIPTION OF THE PREFERRED EMBODIMENTS

FIG. 1A is a schematic view of an acoustic logging system illustrating this invention. A logging sonde 20 is adapted to be raised and lowered into a well. The sonde contains a quadrupole shear wave source 22 and two detectors 24, 25. To initiate logging, sonde 20 is suspended into a fluid 26 contained in a borehole 28 which is surrounded by an earth formation 30. Detectors 24, 25 are so connected to sonde 20 that they are spaced longitudinally along borehole 28 from each other and from source 22. Source 22 is connected to a firing and recording control unit 32. Although the firing and control recording unit is shown in FIG. 1A as a separate unit from the logging sonde, the part of the unit that powers the quadrupole shear wave source may, for convenience in operation, be housed by the logging sonde. Signals recorded by detectors 24, 25 are fed to a band pass filter 36, an amplifier 38 and a time interval unit 40.

In a manner explained below, the firing and recording unit is used to fire source 22 which produces a quadrupole shear wave in formation 30. The quadrupole shear wave arrival is detected by detectors 24 and 25. The axis of the well is a pressure wave node for quadrupole radiation. Therefore, for the quadrupole shear wave arrival to be detected, detectors 24, 25 should not be on the well axis. Sonde 20 also contains a preamplifier (not shown in FIG. 1A) which amplifies the quadrupole shear wave arrival detected by detectors 24, 25. The amplified signals are then filtered by filter 36 and amplified again by amplifier 38. The time interval between the detection of the arrival by detector 24 and its detection by detector 25 is then measured by time interval unit 40. Such time interval may be stored or displayed as desired.

Figure 1B:
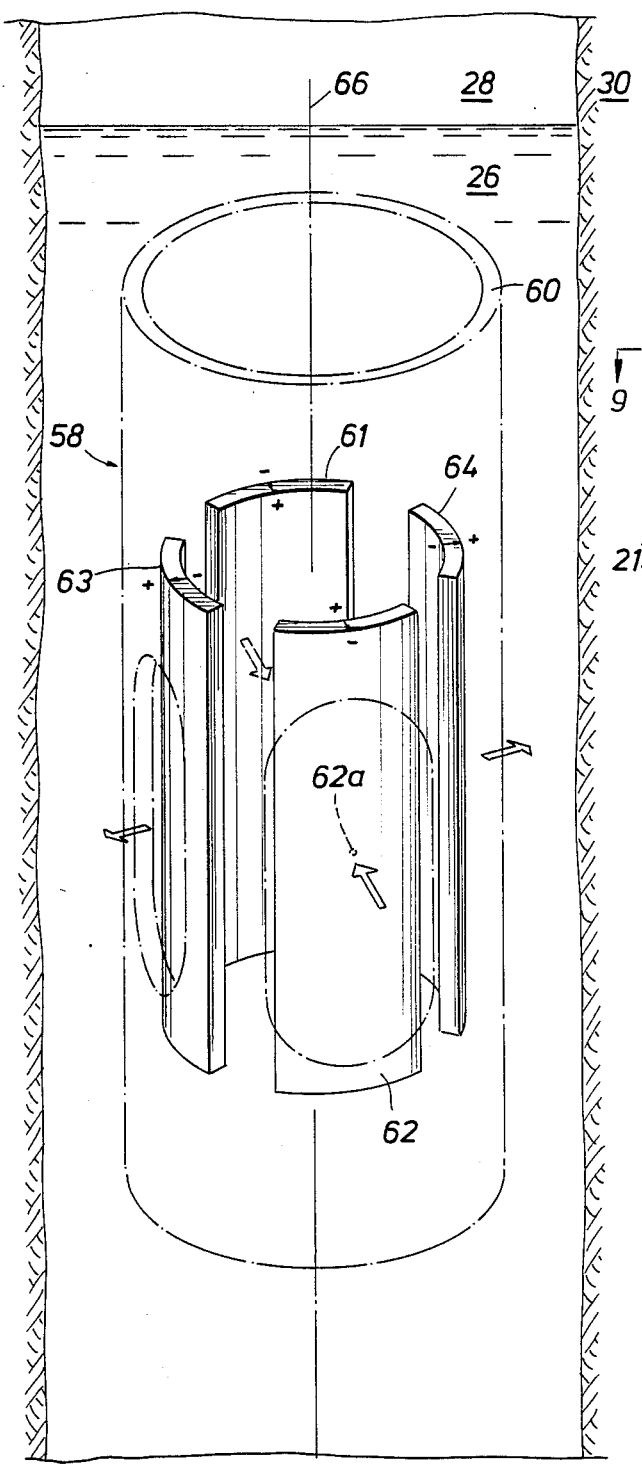
FIG. 1B is a simplified perspective view of the quadrupole shear wave logging source illustrating the preferred embodiment of this invention.

FIG. 1B is a simplified perspective view of a quadrupole shear wave logging source illustrating the preferred embodiment of this invention. As shown in FIG. 1B, the quadrupole logging source 58 comprises a logging sonde 60 and four members 61, 62, 63 and 64. In the preferred embodiment as shown in FIG. 1B, the logging sonde 60 is a hollow cylinder having an axis 66 and each of the four members is a sector of a hollow cylinder made from a piezoelectric material. The four members are so connected to sonde 60 that they are substantially coaxial with the sonde and surround the sonde axis 66 in the cyclic order 61, 63, 62 and 64. The four members are polarized in selected directions. In the preferred embodiment, the four members are polarized in radial directions, although members polarized in circumferential directions may also be used as will be described later.

Electrical pulses are applied across the inner and outer cylindrical surfaces of each of the four members causing each member to expand or contract radially. Square electrical pulses have been acceptable. If all four members are polarized in radially outward directions as shown in FIG. 1B and electrical pulses are so applied to members 61, 62 that the inner cylindrical surfaces of members 61 and 62 are at higher electrical potentials than the outer cylindrical surfaces, members 61 and 62 will initially contract radially. The directions of contraction are shown as arrows in FIG. 1B. Electrical pulses are applied to members 63 and 64 such that the outer cylindrical surfaces of such members are at higher electrical potentials than their inner cylindrical surfaces. Members 63 and 64 will then initially expand radially in directions as shown in FIG. 1B. If electrical pulses are applied substantially simultaneously to the four members, the four members will generate four pressure waves substantially simultaneously: expansion of members 63 and 64 will generate positive pressure waves and the contraction of members 61 and 62 will generate negative pressure waves. If the electrical pulses applied to the four members have overlapping frequencies and have a common component with frequencies in such overlapping frequencies, the four pressure waves generated will interfere and penetrate the earth formation 30 surrounding the quadrupole source 58 and produce a quadrupole shear wave in the earth formation. Preferably the electrical pulses applied to the four members are of substantially similar waveforms. Logging sonde 60 has four windows adjacent to the four members which allow the pressure waves generated by the four members to propagate readily through the windows into the borehole fluid.

The quadrupole shear wave in the earth formation 30 produced by quadrupole source 58 may be detected at a location spaced longitudinally along the borehole from source 58 in a manner to be described below in reference to FIG. 4.

As discussed earlier, the quadrupole shear wave source 58 may be used to generate four pressure waves in the borehole fluid, and refraction of the resulting combined pressure wave into the surrounding earth formation will produce a quadrupole shear wave in the earth formation. Refraction of such resulting combined pressure wave will also produce a refracted pressure wave in the earth formation, but the amplitude of such refracted pressure wave is significantly lower than that of the refracted quadrupole shear wave. Thus by adjusting the triggering level of the detecting and recording systems, the quadrupole shear wave arrival becomes the first arrival detected by a detector.

The common components of the two negative pressure waves generated are preferably substantially in phase and preferably substantially opposite in phase to the common components of the two positive pressure waves generated. This will improve efficiency of the quadrupole source. Conventional pressure wave logging employs pressure waves in the form of wave pulses. While the four pressure waves described in reference to FIG. 1B may be pressure wave pulses, longer wave trains may also be used. Preferably the four pressure waves are pressure wave pulses of substantially the same wave form. With such wave forms, the method of this invention is more efficient since the interference of only the common components of the four pressure waves with one another contributes to generation of a quadrupole shear wave in the formation.

The common components with overlapping frequencies of the four pressure waves generated by the quadrupole shear wave source preferably have frequencies within certain ranges. Such preferred frequency ranges vary with the type of earth formation with different shear wave velocities. Thus, if the approximate range of shear wave velocities is known, a preferred range of frequencies can be chosen. For a well with ten inches diameter, the preferred frequency ranges of overlapping frequencies for different ranges of shear wave velocities are shown in the table below:

| Approximate Range of Shear Wave Velocities | Preferred Frequency Range of Overlapping Frequencies |
|---|---|
| 5000–6000 ft/sec | 3–14 KHz |
| 6000–7000 ft/sec | 3.5–18 KHz |
| 7000–8000 ft/sec | 3.7–21 KHz |
| 8000–9000 ft/sec | 4–25 KHz |

If the frequency range of overlapping frequencies of the four pressure waves is from 4 KHz to 14 KHz, then the quadrupole shear wave source operates in the preferred frequency ranges for the entire range of shear wave velocities from 5000 ft/sec to 9000 ft/sec. The approximate range of shear wave velocities of a formation may be estimated by a conventional method, such as measuring the pressure wave velocities of the formation. The shear wave velocity is approximately one half the pressure wave velocity. From the pressure wave velocities measured, the approximate range of shear wave velocities may be estimated.

The preferred frequencies vary inversely with the diameter of the well. Therefore, for a well with diameter d inches instead of ten inches, the preferred frequency ranges are given by those listed in the table above multiplied by a factor 10/d.

The frequencies at which the quadrupole shear wave source may be operated are much higher than the operating frequencies of other on line logging devices known to the Applicants. The higher frequencies at which the quadrupole shear wave source may be operated enable the shear wave velocity of earth formations to be measured more accurately.

In the preferred embodiment, the four members are four sectors of a hollow cylinder and are substantially coaxial with and equidistant from the sonde axis. Sectors of different cylinders with different radii may also be used. It will be appreciated that such four sectors may be used even if they are not coaxial with the sonde axis provided that their axes are substantially parallel to the sonde axis and that they are so oriented that the sonde axis is on the concave side of each sector. Such a configuration may be achieved by moving the four members 61 to 64 of FIG. 1B radially away from axis 60 by different distances. The cyclic order 61, 63, 62, 64 of the four members in FIG. 1B defines the relative positions of the four members. Since the order is cyclic, any one of the following cyclic orders may be used to arrive at the same relative positions: 63, 62, 64, 61; 62, 64, 61, 63 and 64, 61, 63, 62. While the four members are preferably substantially evenly spaced around axis 66 as shown in FIG. 1B, it will be understood that configurations in which the four members are not evenly spaced around axis 66 may also be used and are within the scope of this invention. Interchanging two members oppositely situated, such as 61, 62 or 63, 64 also will not affect the operation of the source of FIG. 1B.

The four members 61, 62, 63 and 64 need not be sectors of a hollow cylinder as shown in FIG. 1B but may be bodies of any shape or size so long as their centroids are located relative to one another in a manner described below and they generate pressure waves in a manner similar to that of the sectors in FIG. 1B described earlier. The centroid is defined in the American Heritage Dictionary of the English Language, 1978, Houghton Mifflin Co., Boston, Mass. as the center of mass of an object having constant (i.e. uniform) density. If the object has varying density, the centroid of such object may be defined as the point which would be the centroid of such object if such object were of constant density. The centroid of member 62 is shown as 62a in FIG. 1B.

The four members (first, second, third and fourth members) of any shape or size are so connected to a housing that in a quadrilateral, the four corners of which are defined by the centroids of the first, second and third members and the normal projection of the centroid of the fourth member on the plane defined by and containing the centroids of the first, second and third members, the four angles of the quadrilateral are each less than 180°. The four members are vibrated by a vibrating means such that the members with centroids at two diagonally opposite corners generate positive pressure waves and the remaining two members negative pressure waves where the four pressure waves have a common component wave. Then the four pressure waves so generated will interfere to produce a quadrupole shear wave in the earth formation. Preferably the centroids of the four members are coplanar and form the four corners of a square. Preferably, the plane containing the centroids is perpendicular to the borehole axis. If the four members are small so that they become essentially point pressure wave sources, then the four pressure waves are generated substantially at four points which are spatially located in the same manner as the centroids of the four members.

The polarization of the four members may be radially inward, opposite to those shown in FIG. 1B. In such event, members 61, 62 will move outward and members 63, 64 inward. If the polarities of the pulses applied to the four members are reversed, the same reversal of directions of the four members will result. If members 61, 62 are polarized radially outward but members 63, 64 are polarized radially inward, and electrical pulses are so applied that the inner surfaces of the four members are initially at higher electrical potentials than their outer surfaces, members 61, 62 will initially contract radially and members 63, 64 will initially expand radially. All such designs may be used for source 58 to produce quadrupole shear waves. Preferably the four members are substantially identical in shape and size and are distributed symmetrically around axis 66 and at the same depth in the borehole and axis 66 coincides with the borehole axis. With such shape, size and distribution, the quadrupole shear wave source 58 operates more efficiently.

Figure 2:
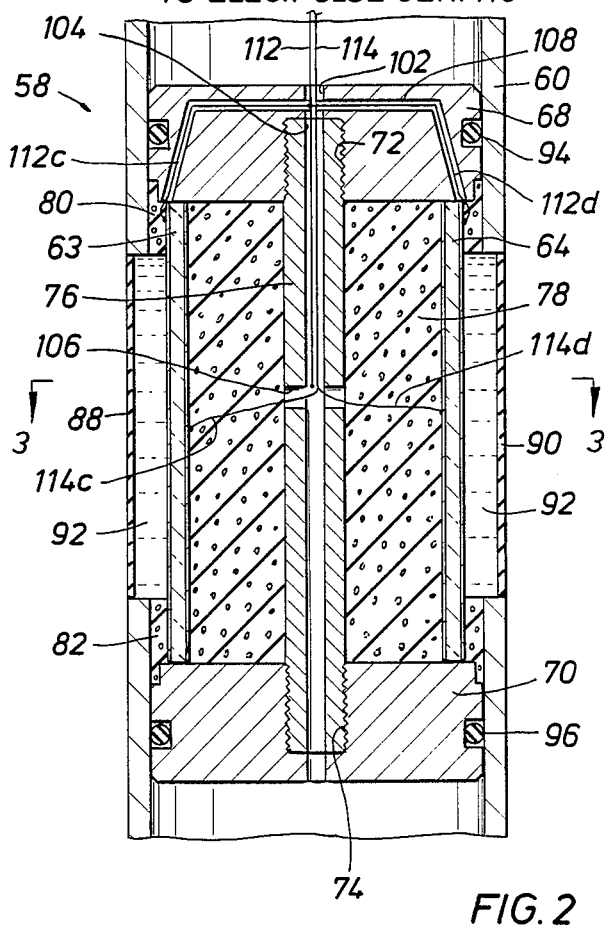
FIGS. 2 and 3 illustrate in more detail the preferred embodiment of this invention.
Figure 3:
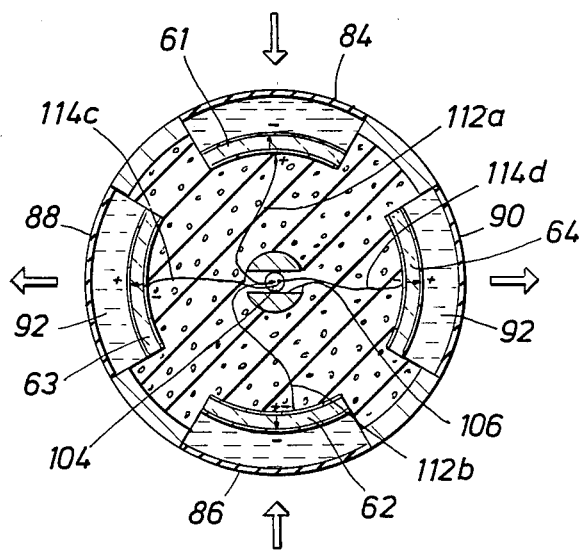

FIGS. 2 and 3 illustrate in more detail the preferred embodiment of this invention. FIG. 2 is a cross-sectional view of the quadrupole shear wave logging source of FIG. 1B taken on a plane containing logging sonde axis 66. FIG. 3 is a view taken along line 3—3 in FIG. 2 showing a cross-section of the quadrupole source on a plane perpendicular to the axis of the logging sonde.

The four piezoelectric members 61, 62, 63 and 64 may be connected to the logging sonde 60 as shown in FIG. 2. Pistons 68 and 70 are of such diameters that they fit snugly into logging sonde 60. Pistons 68 and 70 have threaded recesses, 72 and 74 respectively, and the two pistons may be connected by a piston rod 76, the two ends of which are threaded and are of such sizes that they may be screwed into recesses 72 and 74 of pistons 68 and 70. To assemble source 58, piston rod 76 is inserted into an annular body of backing material 78 and the four members 61 through 64 are placed on the outer cylindrical surface of body 78 so that they are substantially coaxial with the piston rod 76. Two annular rings of packing material 80 and 82 fit snugly over the four members and body 78 to keep the members in place. Piston rod 76 and pistons 68 and 70 are then assembled as described earlier and the entire assembly is inserted into the logging sonde 60. Logging sonde 60 has four windows distributed around its circumference and enclosed sealingly by four rubber membranes 84, 86, 88 and 90.

The four rubber membranes sealingly close the four windows by being attached to the logging sonde by conventional means, such as mechanical clips. The spaces between the four rubber membranes and the four piezoelectric members are filled by oil 92. O-rings 94 and 96 seal the contacting surfaces between pistons 68, 70 and logging sonde 60 to prevent leakage of oil 92.

To provide for passageway for electrical connections, piston 68 and piston rod 76 have holes 102, 104 through their centers respectively. The two holes communicate with each other. Piston rod 76 further has a passageway 106 which is perpendicular to its axis and which communicates with hole 104. Piston 68 further has four passages 108 in communication at one end with the hole 102 and the other end leading to the outer cylindrical surfaces of the four members. Electrical pulse generator 110 is connected to the four members by two groups of wires: Group 112 comprising four wires 112a, 112b, 112c and 112d; and Group 114 comprising wires 114a, 114b, 114c and 114d. Group 112 wires are connected to the positive terminal of the generator and Group 114 wires to the negative terminal. Wires 112c and 112d are threaded through hole 102 and then through the passages 108 and are connected to the outer cylindrical surfaces of the members 63 and 64. Wires 112a and 112b are threaded through the hole 102 of piston 68 and hole 104 of piston rod 76 and are then connected through hole 106 and body 78 to the inner cylindrical surfaces of members 61 and 62 respectively. In a similar manner, wires 114a and 114b are threaded through hole 102, passages 108, and are connected to the outer cylindrical surfaces of members 61 and 62 respectively. Similarly, wires 114c and 114d are threaded through holes 102, 104 and 106 and are connected to the inner cylindrical surfaces of members 63 and 64 respectively. Thus, when electrical pulse generator 110 applies an electrical pulse across the two groups of wires, the pulse is applied across each pair of wires connected to one of the four members. Such a pulse causes the inner cylindrical surfaces of members 61 and 62 to be at a higher electrical potential than their outer cylindrical surfaces. If members 61 and 62 are polarized radially outward, it is well known that such electrical potentials will cause members 61 and 62 to contract radially initially. The pulses applied by generator 110 will cause the outer cylindrical surfaces of members 63 and 64 to be at a higher electrical potential than their inner cylindrical surfaces. Members 63 and 64 are polarized radially outward and such electrical potential will cause the two members to expand radially initially.

Connected in the above manner, therefore, substantially the same electrical pulse is applied by generator 110 substantially simultaneously to the four members, causing the four members to move substantially simultaneously: members 61 and 62 to contract and move inward initially and members 63 and 64 to expand and move outward initially. It is well known that after a piezoelectric material is caused to expand or contract initially by an electrical pulse, it will alternately expand and contract even though no electrical pulses are supplied after the initial triggering pulse. Thus, after the electrical pulses are applied to the four members which cause members 61 and 62 to contract and members 63 and 64 to expand, members 61 and 62 will then alternately expand and contract, and members 63 and 64 will alternately contract and expand. In their alternate expansions and contractions, the four members lose energy and their vibrations are eventually dampened out, but in the duration of their expansion and contraction, the four members generate four pressure wave trains. Since the four electrical pulses applied by generator 110 to the four members are substantially the same except for polarity, the four pressure wave trains have substantially the same wave form. The wave trains generated by members 61 and 62 are substantially in phase. The wave trains generated by members 63 and 64 are substantially in phase with each other but are substantially opposite in phase to the wave trains generated by members 61 and 62. Such pressure waves are transmitted through oil 92, the rubber membranes, then into the borehole fluid 26 and eventually into earth formation 30. The four pressure waves so generated will interfere and produce a quadrupole shear wave in the earth formation 30. Such shear wave propagates through the earth formation, is refracted back into the borehole fluid 26 and is detected at a distance from the logging source 58 as will be explained below. Body 78 is preferably made of a backing material with good damping qualities to damp out the reverberations of the four members so that the four pressure wave trains generated by the four members are short in duration.

The four piezoelectric members 61 through 64 may be readily made from piezoelectric crystals available commercially. Piezoelectric crystals supplied by the Vernitron Company of Bedford, Ohio have been satisfactory. One type of commercially available piezoelectric crystal is in the form of a hollow cylinder polarized radially outward. The inner and outer cylindrical surfaces of such crystals are each coated with a layer of conducting material, such as silver. Since the electrical pulse from generator 110 are applied to adjacent members of the four members in opposite polarity, the inner cylindrical surfaces of adjacent members as well as their outer cylindrical surfaces must be electrically insulated. Such insulation may be achieved by cutting out four narrow longitudinal sections to yield the four sectors 61 through 64. Alternatively, instead of cutting out such narrow longitudinal sections, the conducting layer on both the inner and outer surfaces of such sections may be scraped off.

Figure 4:
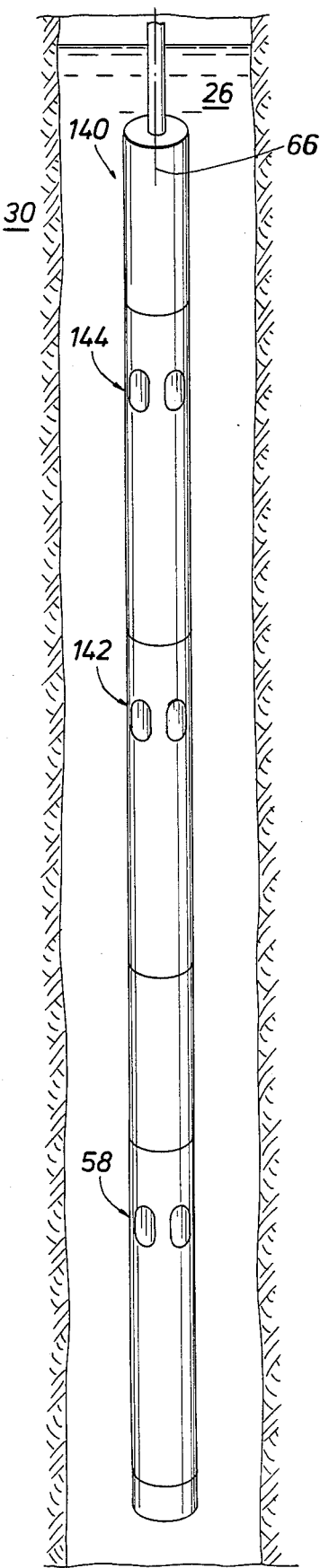
FIG. 4 is a simplified partially perspective and partially schematic view illustrating how the preferred embodiment of this invention may be used to log shear wave velocity.

FIG. 4 is a simplified, partly perspective and partly schematic view, illustrating how the preferred embodiment of this invention may be used to log shear wave velocity. As shown in FIG. 4, the logging sonde 140 comprises the quadrupole shear wave logging source 58 and two detectors 142 and 144. The two detectors are closer to the surface of the earth than source 58 to simplify electrical connections in sonde 140. The two detectors are preferably quadrupole detectors which will be described later in reference to FIG. 6. When the quadrupole shear wave logging source 58 is activated by an electrical pulse, it generates a quadrupole shear wave in earth formation 30 as described above. Part of such quadrupole shear wave travels upwards. It is partially refracted back into the borehole fluid 26 adjacent to the detector 142 and is detected by detector 142. Part of such quadrupole shear wave, however, travels further upwards and is refracted into the borehole fluid 28 adjacent to the detector 144 and is detected by detector 144. Therefore, the time interval between detection of the refraction of the quadrupole shear wave by detector 142 and its detection by detector 144 gives the travel time of the quadrupole shear wave necessary to travel the distance between the two detectors. It will be appreciated that while using two detectors is preferred, using one detector is adequate. Where only one detector is used, the travel time of the quadrupole shear wave between source 58 and the detector is given by the time interval between the generation of the four pressure waves by source 58 and detection of the quadrupole shear wave arrival by the detector.

The four pressure waves generated by source 58 described above will interfere to produce not only a quadrupole shear wave in earth formation 30 but also a dipole and a monopole shear wave. The monopole and dipole shear waves are much smaller in amplitude compared to the quadrupole shear wave and appear in the record of the detector signal as noise. Such noise may be reduced in a manner explained as follows.

Figure 5:
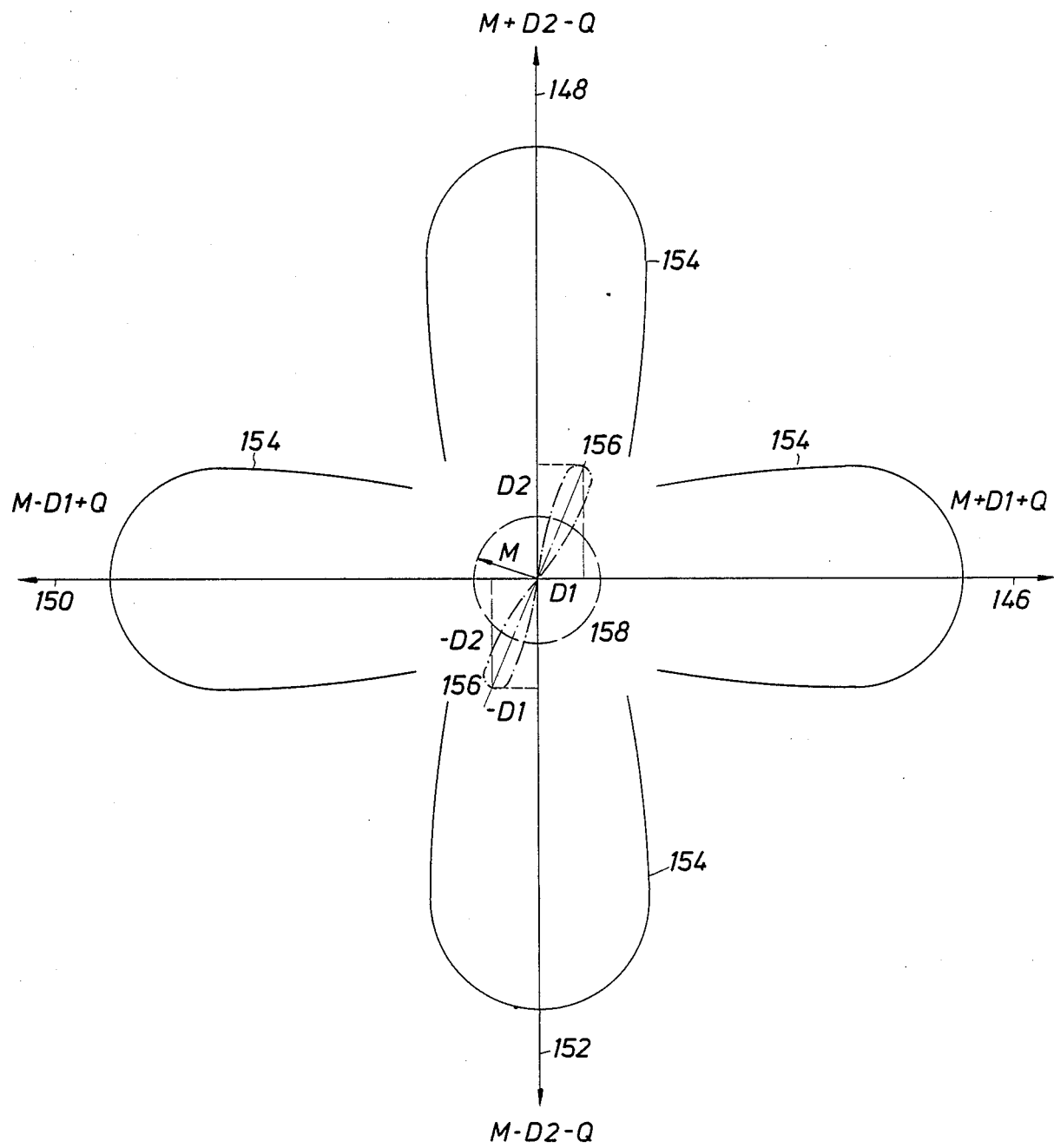
FIG. 5 is a schematic view of the radiation pattern of the quadrupole wave and of the monopole and dipole wave noise illustrating a method to reduce such noise.
Figure 6:
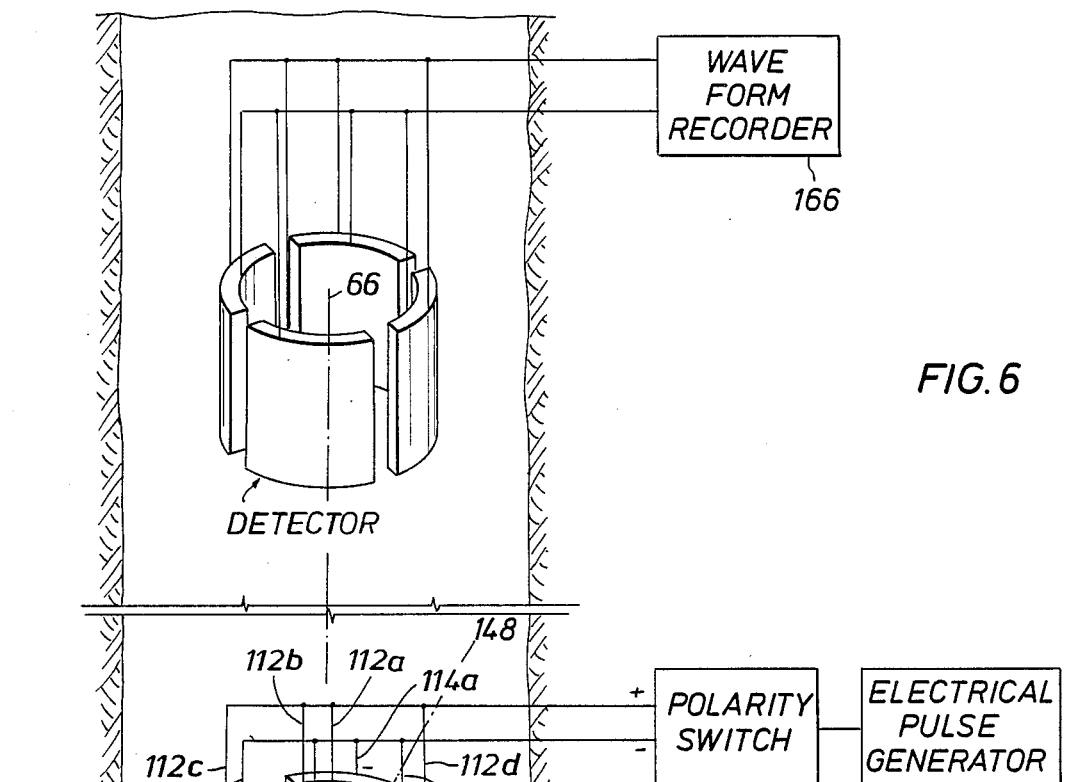
FIG. 6 is a schematic view of a quadrupole shear wave logging device illustrating a method to reduce noise caused by monopole and dipole shear waves.

FIG. 5 illustrates the radiation pattern of a quadrupole wave with dipole and monopole waves as noise. The two perpendicular straight lines in FIG. 5 are the symmetrical axes of the quadrupole wave: one line having directions 146, 150 opposite to each other and the other line having directions 148, 152 opposite to each other. The radiation pattern of the quadrupole wave is shown in FIG. 5 as 154. The radiation patterns of the dipole and monopole noise are illustrated in FIG. 5 in dotted lines as 156 and 158. If the four members of source 58 are four identical sectors of a cylinder and are symmetrically distributed around axis 66 as shown in FIG. 6, one of the symmetrical axes passes through the centers of two oppositely situated members and the other axis passes through the centers of the remaining two members as illustrated in FIG. 6. The monopole noise, the radiation pattern of which is illustrated in 158 in FIG. 5, is symmetrical and has magnitude M. The dipole noise, the radiation pattern of which is represented as 156 in FIG. 5, may have any orientation with respect to the symmetrical axes of the quadrupole wave. As shown in FIG. 5, the dipole noise has components D1, D2, −D1 and −D2 in directions 146, 148, 150 and 152, respectively. The quadrupole wave 154 has components Q, −Q, Q, and −Q in directions 146, 148, 150 and 152, respectively.

If the four members in the detector are aligned with the four members in source 58 as shown in FIG. 6 and the radiation patterns of the quadrupole wave and monopole and dipole noise generated by source 58 are as shown in FIG. 5, the signal detected by the detector is M+D1+Q and such signal is recorded as the first logging record. Source 58 is rotated by substantially 90° relative to the detector about the common axis of the source and detector and the second logging record is made. The signal record will be M+D2−Q. Source 58 is rotated another 90° after the second recording so that it is now rotated 180° from its position during the first recording. A third recording is made and the signal recorded will be M−D1+Q. Source 58 is rotated another 90° so that it is rotated 180° from its position during the second recording. A fourth recording is made and the signal recorded will be M−D2−Q. Subtracting the sum of the second and fourth records from the sum of the first and third records will substantially reduce noise caused by monopole and dipole shear waves generated by source 58 in the formation.

While the method for noise reduction described above is illustrated with quadrupole shear wave source and detector, each comprising four substantially identical transducers symmetrically distributed around the logging sonde axis, it will be appreciated that this same method may be practiced using other quadrupole shear wave sources and detectors. Where the source and detector are not coaxial, or where the source and detector do not have axes, instead of rotating the source about the common axis of the source and detector as in the method above described, the source is rotated about a line passing through both the source and detector.

In situations where it is inconvenient to physically rotate the quadrupole shear wave source relative to the detector, some of the monopole shear wave noise may be reduced by reversing the polarity of the pulse signal applied across the two groups of wires 112 and 114 between two logging recordings. Subtraction of one record from the other will reduce noise caused by monopole shear waves. It will be seen that if the polarity of the pulse signal is reversed, the quadrupole shear wave generated will reverse in polarity as if the quadrupole shear wave source has been rotated by 90°. Part of the monopole shear wave noise will not reverse in polarity between the two records. Subtraction of one logging record from the other will reduce this part of the monopole shear wave noise. The polarity of the pulse signal applied across the two groups of wires, 112 and 114, may be reversed readily by a polarity switch 168 connected between source 58 and pulse generator 110 as shown in FIG. 6.

The conventional detector is symmetrical and cannot be used to detect changes caused by rotation of the source 58. To detect such changes, detectors 142 and 144 are preferably quadrupole detectors which may be similar to source 58 in construction except that instead of being connected to a pulse generator, the two detectors are connected in similar manner to a wave form recorder 166 as illustrated in FIG. 6 (only one detector and its connection to recorder 166 are shown in FIG. 6). The four members in each of the two detectors are preferably aligned azimuthally with the four members in source 58 in reference to the sonde axis 66 as shown in FIG. 6. Since the borehole axis is a pressure wave node for quadrupole radiation, preferably none of the four members is on the borehole axis. For best results, the four members are coaxial with the borehole.

In reference to FIG. 4, the two detectors 142 and 144 are preferably quadrupole detectors. Preferably the four members of each of the two detectors are azimuthally aligned with the four members of source 58 as shown in FIG. 6. Other types of detectors may also be used. A conventional, piezoelectric, hollow, cylindrical type detector may be used if one, two or three of the four windows shown in FIG. 3 as sealed by membranes 84, 86, 88 and 99 are covered by a material to substantially reduce acoustic wave transmission through such windows. If two of such windows are to be covered, they should be oppositely situated, such as the two windows sealed by membranes 84, 86, or the two by membranes 88 and 90.

Alternate Embodiments

Figure 7:
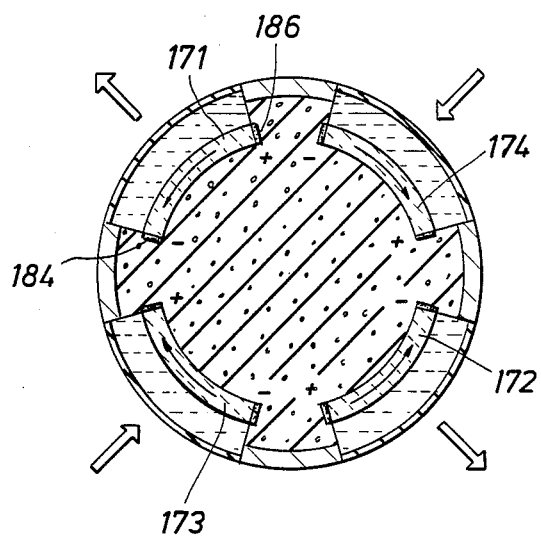
FIGS. 7 and 8 are cross-sectional views of two different quadrupole shear wave sources illustrating two alternate embodiments of this invention.
Figure 8:
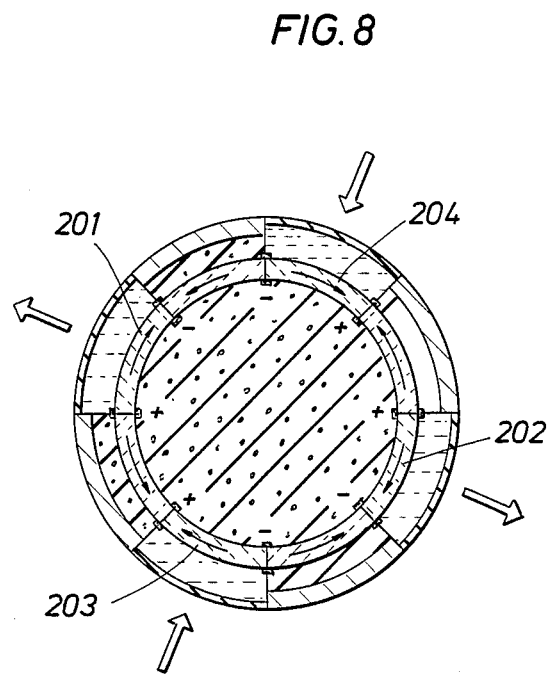

In the preferred embodiment illustrated in FIGS. 2 and 3, the four members are polarized radially. Alternatively, the four members may be polarized circumferentially so that the members are in what is known as the hoop mode. FIGS. 7 and 8 are cross-sectional views on planes perpendicular to the logging sonde axis illustrating alternate embodiments using piezoelectric crystals in the hoop mode. As shown in FIG. 7, the four members 171, 172, 173 and 174 are polarized circumferentially. Except for the directions of polarization and electrical connections, the construction of such alternate embodiments is the same as that of the preferred embodiment.

Electrical pulses are applied across each member so that the resulting electrical field in such member is substantially parallel to its polarization. The electrical pulse will cause such member to expand or contract radially depending upon the polarity of the pulse. The four members may be obtained from a hollow cylindrical piezoelectric cylinder by cutting out four narrow longitudinal sectors. The exposed side surfaces of the members are substantially rectangular in shape and are coated with a conducting layer, such as silver. An electrical pulse is then applied across the two conducting layers of each member. The conducting layers for member 171 are layers 184 and 186 as shown in FIG. 7. The conducting layers of adjacent members are separated so that different potentials may be applied to adjacent edges of members. The electrical pulses are so applied that the resulting electric field in each member is substantially parallel to its line of polarization. If the polarizations of members 171, 172 and the electric fields therein are in the circumferential-counterclockwise direction, as in FIG. 7, the two members will expand radially. If the polarizations of members 173, 174 are in the circumferential clockwise direction but the electric fields therein are in the circumferential counterclockwise direction as in FIG. 7, the two members will contract radially. Such clockwise or counterclockwise directions are all in reference to viewing from the same end of the sonde axis. If electrical pulses of the type used in the preferred embodiment are applied substantially simultaneously to the four members, the pressure waves generated by the four members will interfere and produce a quadrupole shear wave in the surrounding earth formation in a similar manner as in the preferred embodiment. As in the preferred embodiment, the four members of FIG. 7 need not be coaxial with the logging sonde so long as their axes are substantially parallel to the sonde axis and the sonde axis is spaced apart from and on the concave side of each member.

FIG. 8 is a simplified cross-sectional view of another alternate embodiment illustrating a shear wave logging source using the hoop mode. The four members 201, 202, 203, and 204 are four of the eight longitudinal sectors of a piezoelectric hollow cylinder, each of the eight sections having been polarized circumferentially. Adjacent members have opposite circumferential polarization. In this alternate embodiment, the four members are the only sectors of the hollow cylinder which will expand and contract and are all polarized in the circumferential clockwise direction. The connecting edge of any two adjacent sectors among the eight sectors is coated by a conducting layer. The electrical pulses are so applied that the resulting electric field in each member is substantially parallel to its line of polarization. With the polarizations of the four members and the polarities of electrical pulses applied to the four members as shown in FIG. 8, members 201 and 202 will expand radially while members 203 and 204 will contract radially. The remaining four sectors do not expand or contract since no electrical potential difference is applied across such members.

Figure 10:
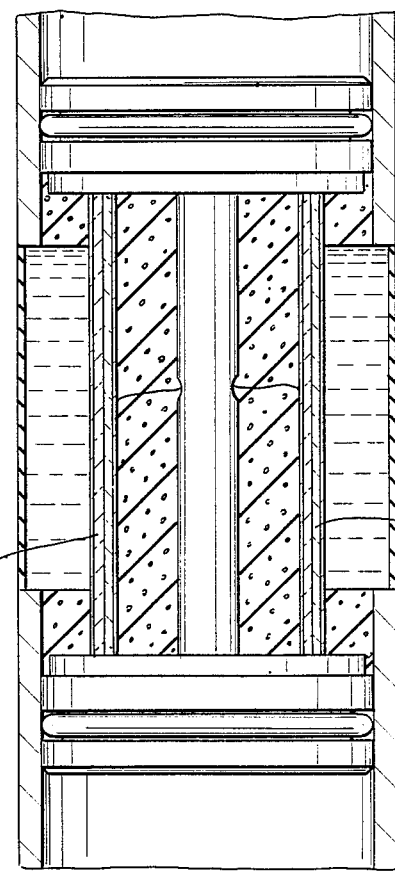
FIGS. 9, 10, 11A, and 11B are cross-sectional views of a quadrupole shear wave logging source illustrating still another alternate embodiment of the invention.
Figure 9:
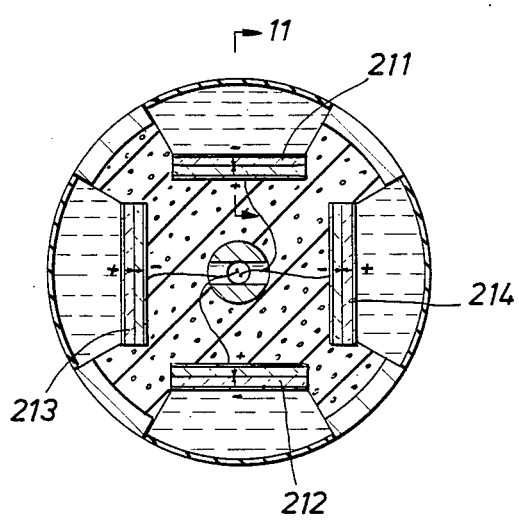

FIGS. 9, 10 are cross-sectional views of a quadrupole shear wave logging source illustrating still another alternate embodiment of the invention. Instead of using cylindrical sections of a hollow piezoelectric cylinder, the four members each comprises two layers, or a pair of piezoelectric plates attached together by their flat surfaces. Except for the four members, the construction of this alternate embodiment is the same as that of the preferred embodiment. Each layer or plate in each member of the alternate embodiment is polarized substantially perpendicularly to its flat surface and the polarization of the two layers or plates are in substantially opposite directions. It is well known that if an electrical pulse is applied across the two flat surfaces of a member comprising a pair of oppositely polarized plates, it will cause the member to bend. The commercially available piezoelectric composite plates which may be used for the generation of acoustic waves are usually sold in the form of two piezolectric plates connected through a conducting layer which is sandwiched between the two piezoelectric plates. The polarizations of the two plates may be in substantially opposite directions as described above, or they may be substantially in the same direction. If the polarizations are in the same direction, then the electrical pulse is applied to each plate so that the electric fields in the two plates have substantially opposite polarities. This conducting layer will enable the electrical pulse applied to each of the two plates to generate more uniform electric fields in such plates and will improve the efficiency of the logging source.

Figure 11A:
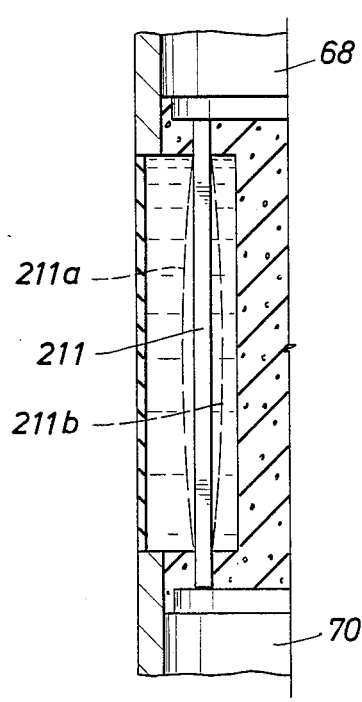
Figure 11B:
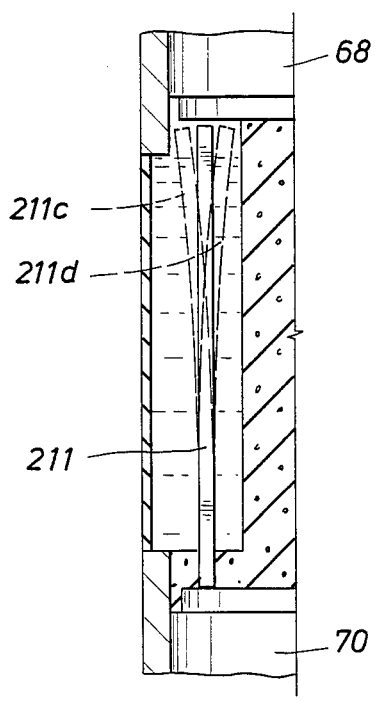

FIG. 11A is a view taken along line 11—11 in FIG. 9 showing a partial cross-section of the quadrupole shear wave logging source of FIG. 9 where two opposite sides of member 211 are attached to pistons 68 and 70 and are fixed. An electrical pulse applied across the flat surfaces of member 211 will cause its mid-portion to bend and vibrate. The extreme positions of the members in the vibration are illustrated by the dotted lines 211a and 211b. FIG. 11B is a view taken along line 11—11 in FIG. 9 showing a partial cross-section of the quadrupole shear wave logging source of FIG. 9 where only one side of member 211 is attached or fixed in position to piston 70. An electrical pulse applied across the flat surfaces of member 211 will cause the portion of member 211 away from the attached side to bend and vibrate with extreme positions as illustrated by the dotted line positions indicated as 211c and 211d. Electrical pulses of opposite polarity are applied to adjacent members in FIG. 9 so that when one member bends inward, the two members adjacent to it will bend outward.

If the polarity of electrical pulses applied to the four members are as shown in FIG. 9 and both ends of each of the four members are attached and fixed as in FIG. 11A, the middle portion of members 211 and 212 will move outwards while the middle portions of members 213 and 214 will move inwards; thereby creating four pressure pulses which will interfere and produce a quadrupole shear wave in the surrounding earth formation. If only one end of each of the four members is secured and fixed to the logging sonde as in FIG. 11B, the unattached end of members 211 and 212 will move inward and those of members 213 and 214 will move outward, thereby also creating two positive pressure waves and two negative pressure waves to produce a quadrupole shear wave in the earth formation.

Preferably the four members shown in FIGS. 9 and 10 are so connected to the sonde that members 211, 212 form a pair of substantially oppositely situated sides of a cube and so do members 213 and 214. It will be understood that plates oppositely situated such as plates 213, 214 need not be parallel to each other and adjacent plates need not be perpendicular to each other. Nor need the plates be rectangular in shape. Configurations where the four members substantially form the four parallelograms of a quadrilateral prism may be used and are part of this invention.

Figure 12:
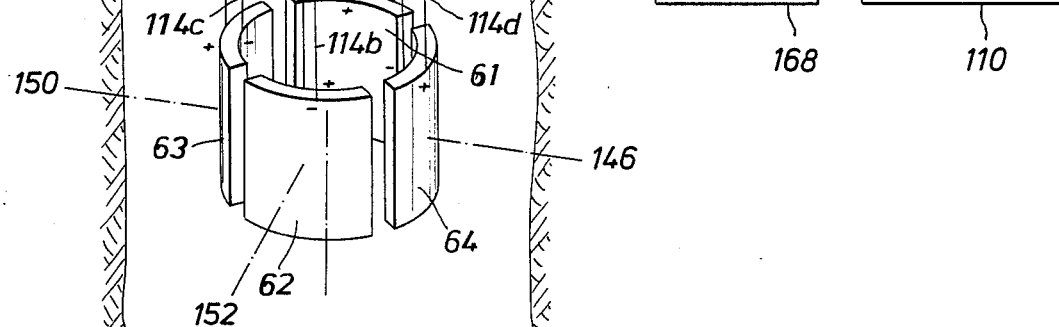
FIG. 12 is a cross-sectional view of a quadrupole shear wave source illustrating yet another alternate embodiment of the invention.
Figure 12:
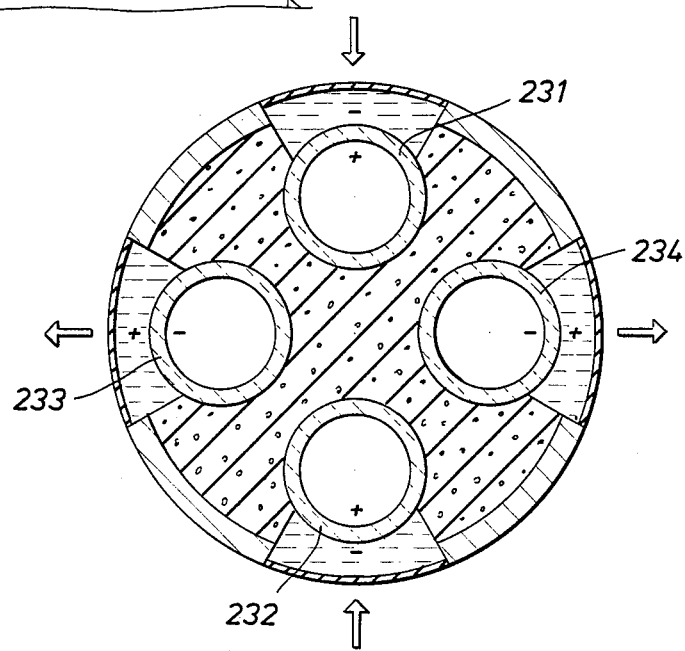

FIG. 12 is the cross-sectional view of a quadrupole shear wave logging source illustrating yet another embodiment of this invention. Four conventional symmetrical sources are used but driven at phases similar to the earlier embodiments. Thus, four radially polarized, hollow, peizoelectric cylinders 231, 232, 233 and 234 are the four members. If the four members are polarized radially outward, and the polarities of the pulses applied are as shown in FIG. 12, members 231, 232 will contract to generate two negative pressure waves and members 233, 234 will expand to generate two positive pressure waves. The four waves interfere as before to produce a quadrupole shear wave in the formation.

While it is more efficient and thus preferable that the four members of FIG. 12 be located symmetrically so that their axes substantially define the parallel edges of a cube, the invention also includes other arrangements as well. It is understood that included in the invention are arrangements where the axes of the members are substantially parallel to the sonde axis and the members encircle the sonde axis in the order: first member (231), third member (233), second member (232), and fourth member (234) and where the expansions or contractions of the four members are as described above in reference to FIG. 12.

The above description of method and structure used is merely illustrative thereof, and various changes in shapes, sizes, materials or other details of the method and construction may be made within the scope of the appended claims, without departing from the spirit of the invention.

We claim:

1. A method of logging the earth surrounding a fluid-containing well, including the steps of: determining the approximate range of shear wave velocities of the earth surrounding the fluid; generating in the fluid two positive pressure waves and two negative pressure waves, said pressure waves having a common component wave, so that the pressure waves will interfere and produce a quadrupole shear wave that will propagate along the well through the earth surrounding the well; detecting the arrival of the shear wave at a point spaced longitudinally along the well from the point of generation of the pressure waves; measuring the time lapse between the generation and the detection to determine the velocity of the shear wave through the earth; wherein the frequencies of the common component of the four pressure waves are in the frequency range corresponding to the approximate range of shear wave velocities of the earth surrounding the fluid in accordance with the table below:

| Approximate Range of Shear Wave Velocities | Frequency Range of Overlapping Frequencies |
|---|---|
| 5000–6000 ft/sec | (10/d)(3–14) KHz |
| 6000–7000 ft/sec | (10/d)(3.5–18) KHz |

-continued

| Approximate Range of Shear Wave Velocities | Frequency Range of Overlapping Frequencies |
|---|---|
| 7000–8000 ft/sec | (10/d)(3.7–21) KHz |
| 8000–9000 ft/sec | (10/d)(4–25) KHz | where d is the borehole diameter in inches.

2. A velocity well logging apparatus comprising:
a housing adapted to be raised and lowered into a well containing fluid;
signal generating means in the housing for transmitting sonic signals into the earth surrounding the well wherein said signal generating means is capable of generating a quadrupole shear wave in the earth surrounding the well, wherein said signal generating means comprises four members and means for vibrating the four members so that vibrations of two of the four members generate two positive pressure waves in the fluid and vibrations of the remaining two members generate two negative pressure waves, wherein the four pressure waves so generated have an overlapping frequency range and a common component pressure wave with frequencies in such overlapping frequency range, and wherein the four members are so located relative to each other that in a quadrilateral, the four corners of which are defined by the centroids of three of the four members and the normal projection of the centroid of the fourth member onto the plane defined by and containing the centroids of said three of the four members, the four angles of the quadrilateral are each less than 180°, and that the two members, the vibrations of which generate two negative pressure waves, have centroids at diagonally opposite corners of the quadrilateral, such that the four pressure waves will interfere to produce a quadrupole shear wave in the earth formation surrounding the well; and
signal detection means in the housing adapted to detect at least one point longitudinally spaced from said signal generating means the arrival of the sonic signals transmitted into the earth surrounding the well by said signal generating means, said point being spaced apart from the axis of the well.

3. A method for acoustically logging an earth formation surrounding a borehole containing a fluid, which comprises:
generating in the fluid substantially simultaneously a first and a second negative pressure wave and a first and a second positive pressure wave, the first and second negative pressure waves being generated at a first and a second point in the fluid respectively, and the first and second positive presure waves being generated at a third and a fourth point in the fluid respectively, wherein the four points are so located that, in a quadrilateral the four corners of which are defined by the first, second and third points and the normal projection of the fourth point on a plane defined by and containing the first, second and third points, each of the four angles of the quadrilateral is less than 180°, and the first and second points define diagonally opposite corners of the quadrilateral, wherein the frequency range of each of the four pressure waves contains an overlapping portion of frequencies defined as a range of frequencies common to the frequency ranges of the four pressure waves, and wherein each of the four pressure waves includes a component wave common to all four pressure waves, said component wave having frequencies in the overlapping portion of frequencies, so that the four pressure waves so generated will interfere and produce a quadrupole shear wave in the earth formation.

4. The method of claim 3 wherein the common components of the two negative pressure waves generated at the first and second points are substantially in phase with each other but are substantially opposite in phase to the common components of the two positive pressure waves generated at the third and fourth points.

5. The method of claim 3 wherein the four pressure waves have substantially the same wave form so that each of the four pressure waves is substantially the same as its common component.

6. The method of claim 3 wherein the four points are substantially coplanar.

7. The method of claim 6 wherein the plane containing substantially the four points is substantially perpendicular to the borehole axis.

8. The method of claim 3 further comprising:
detecting at a selected point in the fluid spaced longitudinally along the borehole from the four points the refracted pressure wave in the fluid caused by refraction of the quadrupole shear wave, said selected point being spaced apart from the borehole axis, and
measuring the time interval between the generation of pressure waves at the four points and the detection of the refracted pressure wave caused by the quadrupole shear wave.

9. The method of claim 3 further comprising:
detecting at two selected points in the fluid spaced longitudinally along the borehole from each other and from the four points of pressure wave generation the refracted pressure wave in the fluid caused by refraction of the quadrupole shear wave, said two selected points of detection being spaced apart from the borehole axis, and
measuring the time interval between the detections at the two selected points of detection of the refracted pressure wave caused by the quadrupole shear wave.

10. An apparatus for acoustically logging an earth formation surrounding a borehole which contains a fluid, said apparatus comprising:
a housing adapted to be suspended into the fluid in the borehole;
a first, second, third and fourth member so connected to the housing that in a quadrilateral, the four corners of which are defined by the centroids of the first, second and third members and the normal projection of the centroid of the fourth member on the plane defined by and containing the centroids of the first, second and third members, the four angles of the quadrilateral are each less than 180° and the centroids of the first and second members define diagonally opposite corners of the quadrilateral;
means connected to the housing for vibrating substantially simultaneously the four members such that each of the first and second members vibrates to generate a negative pressure wave in the fluid and each of the third and fourth members vibrates to generate a positive pressure waves in the fluid wherein the frequency range of each of the four pressure waves contains an overlapping portion of frequencies defined as a range of frequencies common to the frequency ranges of the four pressure waves, and wherein each of the four pressure waves includes a component wave common to all four pressure waves, said component having frequencies in the overlapping portion of frequencies, so that the four pressure waves so generated will interfere to produce a quadrupole shear wave in the earth formation; and
means connected to the housing for detecting at least one selected location in the fluid spaced longitudinally along the borehole from the four members the refracted pressure wave in the fluid caused by refraction of the quadrupole shear wave, said selected location being spaced apart from the borehole axis.

11. The apparatus of claim 10, wherein each of the four members are vibrated by the vibrating means in a selected direction such that, during their initial motions in such vibrations, the first and second members will movre towards each other and the third and fourth members will move away from each other.

12. An apparatus for acoustically logging an earth formation surrounding a borehole which contains a fluid, said apparatus comprising:
a housing adapted to be suspended into the fluid in the borehole;
a first, second, third and fourth member so connected to the housing that in a quadrilateral, the four corners of which are defined by the centroids of the first, second and third members and the normal projection of the centroid of the fourth member on the plane defined by and containing the centroids of the first, second and third members, the four angles of the quadrilateral are each less than 180° and the centroids of the first and second members define diagonally opposite corners of the quadrilateral;
means connected to the housing for vibrating substantially simultaneously the four members such that vibrations of the first and second members generate negative pressure waves in the fluid and vibrations of the third and fourth members generate positive pressure waves in the fluid wherein the frequency range of each of the four pressure waves contains an overlapping portion of frequencies defined as a range of frequencies common to the frequency ranges of the four pressure waves, and wherein each of the four pressure waves includes a component wave common to all four pressure waves, said component having frequencies in the overlapping portion of frequencies, wherein the common components of the two positive pressure waves are substantially in phase with each other but substantially opposite in phase to the common components of the two negative pressure waves, so that the pressure waves so generated will interfere and produce a quadrupole shear wave in the earth formation; and
means connected to the housing for detecting at least one selected location in th fluid spaced longitudinally along the borehole from the four members the refracted pressure wave in the fluid caused by refraction of the quadrupole shear wave, said selected location being spaced apart from the borehole axis.

13. The apparatus of claim 10 or 12 wherein each of the four members is made of a piezoelectric material and its polarized and wherein the vibrating means comprises an electrical pulse applying means which applies electrical pulses scross the four members to generate pressure waves in the fluid.

14. The appoaratus of claim 13 wherein each of the four members comprises a sector of a polarized, hollow piezoelectric cylinder and wherein the electrical pulses from the electrical pulse applying means cause each of the four sectors to alternately expand and contract radially in reference to its axis, thereby generating pressure waves in the fluid.

15. The apparatus of claim 13 wherein each of the four members comprises a composite plate member each comprising two plates with polarizations substantially opposite to each other and substantially perpendicular to the flat surfaces of the composite plate member, and wherein electrical pulses from the electrical pulse applying means will cause the four composite plate members to bend and vibrate thereby generating pressure waves in the fluid.

16. An apparatus for acoustically logging an earth formation surrounding a borehole which contains a fluid, said apparatus comprising:
   a logging sonde having an axis, said sonde being adapted to be suspended into the fluid in the borehole with the sonde axis substantially parallel with the borehole axis;
   a first, second, third and fourth member each comprising a sector of a radially polarized, hollow, piezoelectric cylinder wherein the four members are so connected to the logging sonde that their axes are substantially parallel to the sonde axis, that the sonde axis is spaced apart and on the concave side of each member, and that the four members surround the sonde axis in the cyclic order: first member, third member, second member and fourth member;
   means connected to the logging sonde for applying substantially simultaneously an electrical pulse across the outer and inner cylindrical surfaces of each member, wherein the four electrical pulses applied to the four members have substantially the same waveform, the pulses being so applied that they cause the first and second members to move substantially simultaneously radially inward to generate two negative pressure waves in the fluid and the third and fourth members to move radially outward substantially simultaneously with the motion of the first and second members to generate two positive pressure waves in the fluid, thereby producing a quadrupole shear wave in the earth formation; and
   means connected to the logging sonde for detecting at least one selected location in the fluid spaced longitudinally along the borehole from the four members the refracted pressure wave in the fluid caused by refraction of the quadrupole shear wave, said selected location being spaced apart from the borehole axis.

17. An apparatus for acoustically logging an earth formation surrounding a borehole which contains a fluid, said apparatus comprising:
   a logging sonde having an axis, said sonde being adapted to be suspended into the fluid in the borehole with the sonde axis substantaily parallel with the borehole axis;
   a first, second, third and fourth member each comprising a sector of a circumferentially polarized, hollow, piezoelectric cylinder wherein the four members are so connected to the sonde that their axes are substantially parallel to the sounde axis, that the sonde axis is spaced apart and on the concave side of each member, and that the four members are distributed around the sonde axis in the order: first member, third member, second member and fourth member;
   means connected to the logging sonde for applying substantially simultaneously an electrical pulse across each member, wherein the four electrical pulses so applied to the four members have substantially the same wave form, the pulses being so applied that the electric field in each member is substantially parallel to its line of polarization, wherein the polarities of the electrical pulses applied to the four members are such that the first and second members will move radially inward substantially simultaneously to generate two negative pressure waves in the fluid, and the third and fourth members will move radially outward substantially simultaneously with the motion of the first and second members to generate two positive pressure waves in the fluid, thereby producing a quadrupole shear wave in the earth formation; and
   means connected to the logging sonde for detecting at least one selected location in the fluid spaced longitudinally along the borehole from the four members the refracted pressure wave in the fluid caused by refraction of the quadrupole shear wave. said selected location being spaced apart from the borehole axis.

18. An apparatus for acoustically logging an earth formation surrounding a borehole which contains a fluid, said apparatus comprising:
   a logging sonde having an axis, said sonde adapted to be suspended into the fluid in the borehole;
   a first, second, third and fourth composite plate member, each composite plate member comprising tow layers with polarization directions substantially perpendicular to the flat surfaces of the plate member, the four plate members so connected to the sonde that the four plate members are spaced apart from one another and they substantially form the parallelograms of a quadrilateral prism, with the first and second plate members on opposite sides of the prism and the third and fourth plate members on opposite sides of the prism;
   means connected to the logging sonde for applying substantially simultaneously an electrical pulse across each of the two layers of each composite plate member causing the four plate members to bend, wherein the four electrical pulses so applied to the four members have substantially the same waveform, and wherein the polarities of the electrical pulses applied are such that a portion of each of the first and second plate members will move away from each other substantially simultaneously to generate two positive pressure waves in the fluid, and a portion of each of the third and fourth plate members will move toward each other substantially simultaneously with the motion of the portions of the first and second plate members to generate two negative presure waves in the fluid, thereby producing a quadrupole shear wave in the earth formation; and means connected to the logging sonde for detecting at least one selected location in the fluid spaced longitudinally along the borehole from the four members the refracted pressure wave in the fluid caused by refraction of the quadrupole shear wave, said selected location being spaced apart from the borehole axis.

19. An apparatus for acoustically logging an earth formation surrounding a borehole which contains a fluid, said apparatus comprising:
a logging sonde having an axis, said sonde being adapted to be suspended into the fluid in the borehole with the sonde axis substantially parallel with the borehole axis;
a first, second, third and fourth member each comprising a radially polarized, hollow, piezoelectric cylinder, the four members so connected to the sonde that they are spaced apart from but substantially parallel to the sonde axis and that they are distributed around the sonde axis in the following order: first member, third member, second member and fourth member;
means connected to the logging sonde for applying substantially simultaneously four electrical pulses of substantially the same waveform to the four members, one of the four pulses being applied across the outer and inner cylindrical surfaces of one of the four members, the pulses being so applied that they cause the first and second members to each contract and the third and fourth members to each expand, all substantially simultaneously, to generate two positive and two negative pressure waves in the fluid, thereby producing a quadrupole shear wave in the earth formation; and
means connected to the logging sonde for detecting at least one selected location in the fluid spaced longitudinally along the borehole from the four members the refracted pressure wave in the fluid caused by refraction of the quadrupole shear wave, said selected location being spaced apart from the borehole axis.

20. A method for reducing noise caused by monopole and dipole signals in logging the shear wave velocity of an earth formation surrounding a borehole containing a fluid, wherein a logging record is generated by means of a quadrupole shear wave logging device comprising a quadrupole shear wave source and a quadrupole shear wave detector aligned with and spaced apart from the source, said logging record being generated by activating the quadrupole shear wave source in the fluid to generate a quadrupole shear wave in the formation and detecting by means of the quadrupole detector in the fluid the pressure wave in the fluid caused by refraction of the quadrupole shear wave, said method for noise reduction comprising:
generating a first logging record;
rotating the quadrupole shear wave source by substantially 90° about a line passing through the source and the detector;
generating a second logging record;
rotating the quadrupole shear wave source by substantially 90° about the line so that the quadrupole shear wave source is substantially rotated 180° from its position during the generation of the first logging record; and
generating a third logging record;
rotating the quadrupole shear wave source by substantially 90° about the line so that it is rotated substantially 180° from its position during the generation of the second logging record;
generating a fourth logging record; and
taking the difference between the sum of the second and fourth logging records and the sum of the first and third logging records to reduce monopole and dipole noise.

21. The method of claim 20 wherein the quadrupole shear wave source and the quadrupole shear wave detector each comprises four sectors of a hollow cylinder substantially coaxial with the logging sonde, and the source further comprises means for vibrating the four sectors of the source to generate four pressure waves of similar wave form in the fluid, two positive pressure waves being generated by two oppositely situated sectors and two negative pressure waves by the remaining two oppositely situated sectors, and wherein the line about which the source is rotated is the axis of the logging sonde.

22. A method of logging the earth surrounding a fluid-containing well, including the steps of:
determining the approximate range of shear wave velocities of the earth surrounding the fluid; generating in the fluid two positive pressure waves and two negative pressure waves, said pressure waves having a common component wave, so that the pressure waves will interfere and produce a quadrupole shear wave that will propagate along the well through the earth surrounding the well; detecting the arrival of the shear wave at two points spaced longitudinally along the well from each other and the point of pressure wave generation; measuring the time lapse between the detections at the two points to determine the velocity of the shear wave through the earth; wherein the frequencies of the common component of the four pressure waves are in the frequency range corresponding to the approximate range of shear wave velocities of the earth surrounding the fluid in accordance with the table below:

| Approximate Range of Shear Wave Velocities | Frequency Range of Overlapping Frequencies |
| --- | --- |
| 5000–6000 ft/sec | (10/d)(3–14) KHz |
| 6000–7000 ft/sec | (10/d)(3.5–18) KHz |
| 7000–8000 ft/sec | (10/d)(3.7–21) KHz |
| 8000–9000 ft/sec | (10/d)(4–25) KHz | where d is the borehole diameter in inches.

* * * * *